US009086763B2

(12) United States Patent
Johansson et al.

(10) Patent No.: US 9,086,763 B2
(45) Date of Patent: Jul. 21, 2015

(54) TOUCH FORCE ESTIMATION IN AN FTIR-BASED PROJECTION-TYPE TOUCH-SENSING APPARATUS

(71) Applicant: FlatFrog Laboratories AB, Lund (SE)

(72) Inventors: Andreas Johansson, Eslov (SE); Nicklas Ohlsson, Bunkeflostrand (SE)

(73) Assignee: FLATFROG LABORATORIES AB, Lund (SE)

( * ) Notice: Subject to any disclaimer, the term of this patent is extended or adjusted under 35 U.S.C. 154(b) by 0 days.

(21) Appl. No.: 14/358,872

(22) PCT Filed: Sep. 9, 2013

(86) PCT No.: PCT/SE2013/051044
§ 371 (c)(1),
(2) Date: May 16, 2014

(87) PCT Pub. No.: WO2014/042576
PCT Pub. Date: Mar. 20, 2014

(65) Prior Publication Data
US 2014/0320460 A1   Oct. 30, 2014

Related U.S. Application Data (60) Provisional application No. 61/699,503, filed on Sep. 11, 2012.

(30) Foreign Application Priority Data

Sep. 11, 2012   (SE) ......................................  1251014

(51) Int. Cl.
*G06F 3/042* (2006.01)
*G06F 3/041* (2006.01)

(52) U.S. Cl.
CPC ............ *G06F 3/0421* (2013.01); *G06F 3/0414* (2013.01); *G06F 2203/04109* (2013.01)

(58) Field of Classification Search
CPC .............................. G06F 3/0414; G06F 3/0421
USPC .................................................. 345/173–178
See application file for complete search history.

(56) References Cited

U.S. PATENT DOCUMENTS 8,745,514 B1 *   6/2014   Davidson ........................ 715/766
2009/0085894 A1 *   4/2009   Gandhi et al. ................. 345/175
(Continued)

FOREIGN PATENT DOCUMENTS

EP            2339437 A2      6/2011
WO     WO-2011/049511 A1      4/2011
(Continued)

OTHER PUBLICATIONS

Fihn, Mark. "Touch Panel—Special Edition," Veritas et Visus, Nov. 2011 (p. 18).
(Continued)

*Primary Examiner* — Charles V Hicks
*Assistant Examiner* — Charles Zheng
(74) *Attorney, Agent, or Firm* — Harness, Dickey & Pierce, P.L.C.

(57) ABSTRACT

A device implements a method for estimating the application force of a touching object onto a touch surface in an FTIR-based projection-type touch-sensing apparatus. The apparatus generates projection signals representing radiation that has propagated on a plurality of propagation paths by total internal reflection (TIR) inside a transmissive panel beneath a touch surface of the transmissive panel such that a touching object on the touch surface causes attenuation (frustration) of at least one of the projection signals. The device generates a time series of force values, which represent the application force, based on a time series of magnitude values, which represent a magnitude of a peak in two-dimensional interaction patterns generated by image reconstruction processing of the projection signals, the peak corresponding to the touching object on the touch surface. The force estimation may involve one or more corrections.

17 Claims, 7 Drawing Sheets

(56) References Cited

U.S. PATENT DOCUMENTS

| | | |
|---|---|---|
| 2011/0134079 A1 | 6/2011 | Stark |
| 2012/0038593 A1 | 2/2012 | Ronka et al. |
| 2012/0212441 A1 | 8/2012 | Christiansson et al. |
| 2012/0268403 A1* | 10/2012 | Christiansson ............... 345/173 |
| 2014/0028604 A1 | 1/2014 | Morinaga et al. |

FOREIGN PATENT DOCUMENTS

| | | |
|---|---|---|
| WO | WO-2011/049513 A1 | 4/2011 |
| WO | WO-2012176801 A1 | 12/2012 |

OTHER PUBLICATIONS

European Search Report dated Jan. 23, 2014 issued in corresponding European Appln. No. 13183545.6.

International Search Report PCT/ISA/210 for International Application No. PCT/SE2013/051044 Dated on Sep. 9, 2013.

International Written Opinion PCT/ISA/237 for International Application No. PCT/SE2013/051044 Dated on Sep. 9, 2013.

* cited by examiner

TOUCH FORCE ESTIMATION IN AN FTIR-BASED PROJECTION-TYPE TOUCH-SENSING APPARATUS

CROSS-REFERENCE TO RELATED APPLICATIONS

The present application claims the benefit of Swedish patent application No. 1251014-5, filed 11 Sep. 2012, and U.S. provisional application No. 61/699,503, filed 11 Sep. 2012, both of which are incorporated herein by reference.

TECHNICAL FIELD

The present invention generally relates to estimation of application force for touches on touch surfaces of optical touch-sensing systems, and in particular in relation to FTIR-based touch systems of projection-type.

BACKGROUND ART

Touch-sensing systems ("touch systems") are in widespread use in a variety of applications. Typically, the touch systems are actuated by a touching object such as a finger or stylus, either in direct contact, or through proximity (i.e. without contact), with a touch surface. Touch systems are for example used as touch pads of laptop computers, in control panels, and as overlays to displays on e.g. hand held devices, such as mobile telephones. A touch panel that is overlaid on or integrated in a display is also denoted a "touch screen". Many other applications are known in the art.

There are numerous known techniques for providing touch sensitivity, e.g. by incorporating resistive wire grids, capacitive sensors, strain gauges, etc into a touch panel. There are also various types of optical touch systems, which e.g. detect shadows cast by touching objects onto a touch surface, or detect light scattered off the point(s) of touching objects on a touch panel.

One specific type of optical touch system uses projection measurements of light that propagates on a plurality of propagation paths inside a light transmissive panel. The projection measurements thus quantify a property, e.g. power, of the light on the individual propagation paths, when the light has passed the panel. For touch detection, the projection measurements may be processed by simple triangulation, or by more advanced image reconstruction techniques that generate a two-dimensional distribution of disturbances on the touch surface, i.e. an "image" of everything on the touch surface that affects the measured property. The light propagates by total internal reflection (TIR) inside the panel such that a touching object causes the propagating light on one or more propagation paths to be attenuated by so-called frustrated total internal reflection (FTIR). Hence, this type of system is an FTIR-based projection-type touch system. Examples of such touch systems are found in U.S. Pat. No. 3,673,327, U.S. Pat. No. 4,254,333, U.S. Pat. No. 6,972,753, US2004/0252091, US2006/0114237, US2007/0075648, WO2009/048365, US2009/0153519, WO2010/006882, WO2010/064983, and WO2010/134865.

In touch systems in general, there is a desire to not only determine the location of the touching objects, but also to estimate the amount of force by which the touching object is applied to the touch surface. This estimated quantity is often referred to as "pressure", although it typically is a force. The availability of force/pressure information opens up possibilities of creating more advanced user interactions with the touch screen, e.g. by enabling new gestures for touch-based control of software applications or by enabling new types of games to be played on gaming devices with touch screens.

Capacitive touch systems may be designed to estimate the application force/pressure of touches, e.g. as disclosed in EP2088501 and U.S. Pat. No. 4,736,191.

The prior art also comprises optical touch systems that use direct imaging by a camera located behind a transmissive panel to detect light that is scattered off objects that touch the panel. The camera thus captures a direct image of the light scattering objects on the touch surface. WO2011/082477 and US2009/0143141 disclose such optical touch systems and propose to measure the size of each touch in the image and compare the current size to a previously detected size of the same touch for establishing a level of pressure of the touch. Thus, as the size increases, force is considered to increase, and vice versa.

Estimation of application force from touch size has also been suggested for use in FTIR-based projection-type touch systems. WO2011/049511, WO2011/049513 and WO2012/002894 all mention that if the area of a detected touch is changed as a function of applied pressure, the application force between the object and the touch surface may be monitored for each touch by detecting changes in touch area over time.

However, the use of changes in touch area for force estimation is limited to certain types of touching objects, since the objects need to be sufficiently soft and flexible to exhibit a variation in size with application force. Many objects, such as fingertips, only exhibit a relatively small deformation with increased application force, and the change in size may be difficult to detect with sufficient accuracy. Furthermore, a change in size of a peak may have other causes than a change in application force, e.g. a change in position of the touching object.

SUMMARY

It is an objective of the invention to at least partly overcome one or more of the above-identified limitations of the prior art.

Another objective is to provide an alternative technique for estimating application force in an FTIR-based projection-type touch-sensing apparatus.

Yet another objective is to provide such an alternative technique that enables monitoring of relative changes in application force over time for a given touch.

A still further objective is to provide such an alternative technique with a reduced dependence on the size of the touch for estimating application force.

One or more of these objectives, as well as further objectives that may appear from the description below, are at least partly achieved by means of a method for data processing, a computer readable medium, devices for data processing, and an FTIR-based projection-type touch-sensing apparatus according to the independent claims, embodiments thereof being defined by the dependent claims.

A first aspect of the invention is a method of data processing in relation to an FTIR-based projection-type touch-sensing apparatus, wherein the touch-sensing apparatus is operable to generate projection signals representing radiation that has propagated on a plurality of propagation paths by total internal reflections inside a transmissive panel beneath a touch surface of the transmissive panel such that a touching object on the touch surface causes attenuation of at least one of the projection signals. The method comprises a step of obtaining a time series of magnitude values representing a magnitude of a peak in two-dimensional interaction patterns generated by image reconstruction processing of the projection signals, the peak corresponding to a touching object on the touch surface; and a step of generating, as a function of the time series of magnitude values, a time series of force values representing the application force of the touching object onto the touch surface.

The first aspect is based on the surprising insight that the magnitude of the peaks in the two-dimensional interaction pattern scales with application force, at least when tracking a peak corresponding to a given touching object across a time series of interaction patterns. It is currently believed that this unexpected property of the peaks in the interaction pattern is at least partly caused by an increased contact, on a microscopic scale, between the touching object and the touch surface with increasing application force. This increased contact may lead to a better optical coupling between the transmissive panel and the touching object, causing an enhanced attenuation (frustration) of the propagating radiation at the location of the touching object. The radiation may be light at any wavelength, polarized or non-polarized, coherent or non-coherent.

The first aspect thus offers a simple technique for tracking relative changes in application force for a given touching object on an FTIR-based projection-type touch-sensing apparatus. The inventive technique for estimating application force does not rely on detection of touch size, and thus overcomes the limitations of prior art techniques with respect to the need for flexible objects and accurate measurement of touch size.

It should be noted that the method does not have to involve steps for generating the interaction patterns, for detecting one or more peaks in the interaction patterns and for computing the time series of magnitude values for one or more of the detected peaks. Instead, the method may operate on a time series of magnitude values that are retrieved from a data processor, e.g. a controller inside the touch-sensing apparatus, that repeatedly samples the projection signals from signal detectors in the touch-sensing apparatus and processes the sampled projection signals for generation of the time series of magnitude values for the given touching object.

In an alternative embodiment, the method is implemented such that the step of obtaining the time series of magnitude values comprises, repeatedly, the steps of: obtaining current values of the projection signals, processing the current values by image reconstruction to generate a current interaction pattern for the touch surface, identifying a peak associated with the touching object in the current interaction pattern, and computing a magnitude value for the peak. Thereby, the step of obtaining generates a time series of magnitude values for a given touching object.

Each magnitude value represents the magnitude of the peak in the interaction pattern. As known in the art, the interaction pattern comprises a two-dimensional distribution of "interaction values" that represent the local interaction with the propagating radiation across the touch surface at a given time point. Depending on implementation, each interaction value may be generated to represent, in a broad sense, a degree of attenuation or transmission of radiation at a specific location on the touch surface. Consequently, each magnitude value may be generated to represent a degree of attenuation or transmission of radiation at the location of the given touching object on the touch surface. A touching object may thus be represented by a positive peak (increased attenuation) or a negative peak (decreased transmission) in the interaction pattern, depending on implementation.

The magnitude value for a peak may be computed in many different ways. In one example, the magnitude value is given by the extreme (maximum/minimum interaction value) of the peak. In another example, the magnitude value is computed as an average of interaction values near the extreme. In yet another example, the magnitude value is given by the extreme of a three-dimensional function (peak template) which is fitted to the interaction values within the peak. In a further example, the magnitude value is given by an interpolated interaction value at a given location within the peak, e.g. the center of gravity, the geometric center, etc. In a further example, the magnitude value is given by the sum of attenuation values within the extent of the peak.

The present Applicant has also identified potential corrections that may be made to the magnitude values to improve the correspondence between temporal changes in magnitude values for a peak and temporal changes in the actual or intended application force.

One such potential correction is based on the observation that a stationary object, i.e. a touching object that remains in essentially the same location on the touch surface over time, results in an asymptotic increase in attenuation over time even if the application force is unchanged. A similar observation has been made for touching objects that move only slowly on the touch surface over time. The step of generating the time series of force values may include a correction measure to counteract this phenomenon.

Another potential correction is based on the observation that the attenuation decreases with increasing speed of a touching object, even if the application force is unchanged. The step of generating the time series of force values may include a correction measure to counteract this phenomenon.

It should be noted that both of these potential corrections are directly or indirectly associated with the current speed (velocity) of a touching object. Thus, a current force value in the time series of force values may be generated as a function of a current magnitude value among the magnitude values and a current speed of the touching object.

The current speed of the touching object may be retrieved together with the time series of magnitude values, e.g. from a data processor as described above. Alternatively, the method may further comprise the steps of: obtaining a time series of location values representing a location of the touching object on the touch surface; and estimating, based on the time series of location values, the current speed of the touching object. The current speed may be estimated based on any number of preceding location values, using any conceivable algorithm. Furthermore, any conventional measure may be implemented to ensure that the estimated speed properly represents a true displacement of the touching object across the touch surface, e.g. to prevent that small instabilities in the location of the touching object influences the estimated speed. Also, the current speed may be computed as a displacement (distance between location values) over a given time period.

In one embodiment, the method further comprises the steps of: detecting, based on the current speed, that the touching object is in a low speed state, and applying a duration-based modification function to the current magnitude value so as to counteract a gradual increase in attenuation with time for touching objects in the low speed state. This embodiment enables correction or compensation for the temporal increase in attenuation observed in respect of stationary objects and slowly moving objects. The low speed state may be identified by comparing the current speed of a touching object to a predefined speed threshold, which may be determined by testing or modeling for a particular configuration of the touch-sensing apparatus. It is currently believed that an appropriate value for the speed threshold is in the range of 1-50 mm/s, e.g. 5, 10, 15 or 20 mm/s.

In one embodiment, the method further comprises the step of: associating the touching object with an age counter which is incremented with the duration of the touching object in the low speed state, wherein the duration-based modification function operates on the age counter and the current magnitude value. The duration-based modification function may be any suitable function that counteracts, to a required degree, the temporal increase in attenuation for touching objects in the low speed state. In one example, the duration-based modification function comprises an exponential decay function with the age counter as variable.

In one embodiment, the method further comprises the step of: applying an increment to the age counter that decreases with the current speed while the touching object is in the low speed state. Thereby, the age counter is incremented slower with increasing speed, resulting is a smaller correction with increasing speed. This has been found to produce less variability in the time series of force values when the speed of the touching object varies within the low speed state.

The age counter may be set to zero whenever the current speed exceeds the low speed limit, such that the correction by the duration-based modification function is halted whenever the touching object reaches a velocity above the low speed limit. However, this may lead to a step-change in the time series of force values when the touching object is accelerated past the low speed limit. This unwanted effect may be overcome by instead applying a decrement to the age counter when the touching object has left the low speed state. The age counter, and the corresponding correction, is thereby gradually reduced over time as the touching object is accelerated past the low speed limit and continues to move at a velocity above the low speed limit. Furthermore, the decrement may be increased with increasing speed, or equivalently, with increasing distance to a reference location, e.g. the location of the touching object when it accelerated past the low speed limit.

In one embodiment, the method further comprises the step of: applying a speed-based modification function to the current magnitude value so as to counteract a decreasing attenuation with increasing speed of the touching object. The speed-based modification function may be any suitable function that counteracts, to a required degree, the observed decrease in attenuation with increasing speed of a touching object.

In one embodiment, the method further comprises the steps of: operating a low-pass filter on at least one of the time series of force values and the time series of magnitude values. The use of a low-pass filter may reduce any undesirable variability in the time series of force values. Such variability may be caused by measurement noise, image reconstruction noise and other processing noise, inaccuracies in one or more of the corrections (if applied), etc. Furthermore, it has been found that the variability is more pronounced for moving touches than for stationary objects. This may partly be an inherent property of moving objects, since they have a tendency to bounce or vibrate against the touch surface due to friction. These variations in application force are unintentional from the user's perspective, and it may be appropriate to suppress such variations. Furthermore, variations within the interaction pattern, and thus in the magnitude values, may occur when the moving object passes contamination on the touch surface, e.g. a fingerprint.

One drawback of using a low-pass filter is that it may introduce unwanted latency. In one embodiment, the method further comprises the step of: decreasing a cut-off frequency of the low-pass filter with increasing current speed of the touching object. Thus, an object moving at high speed is subjected to a stronger smoothing than a stationary object. This enables both adequate suppression of the variability in the time series of force values, and low latency with respect to stationary objects and objects that accelerate from a stand-still.

In one embodiment, the method further comprises the step of: selectively delaying an increase in cut-off frequency of the low-pass filter when the touching object is deemed to approach a stand-still on the touch surface. This may, e.g., operate to suppress the impact of unintentional variations in application force that may occur when the user halts the movement of the touching object.

The present Applicant has observed that the peak magnitude may increase with peak size, even if the application pressure remains constant, at least in some implementations. In one embodiment, the method further comprises the steps of: obtaining a time series of size values representing a size measure of the peak in the two-dimensional interaction patterns; and applying a size-based modification function to the current magnitude value so as to counteract an increasing attenuation with increasing size of the peak. This will enable the force values to be generated independently of any size variations in the peaks, e.g. size variations that are caused by the user tilting the finger against the touch surface while moving the finger across the touch surface, or by the user tilting the finger from a pointing position perpendicular to the touch surface to a position flat against the touch surface.

It should be understood that the above-described corrections may be applied in any combination and in any order.

A second aspect of the invention is a computer-readable medium comprising computer instructions which, when executed by a data-processing system, are configured to carry out the method of the first aspect.

A third aspect of the invention is a device for data processing in relation to an FTIR-based projection-type touch-sensing apparatus, which is operable to generate projection signals for radiation that has propagated on plurality of propagation paths by total internal reflections inside a transmissive panel beneath a touch surface on the transmissive panel such that a touching object on the touch surface causes attenuation of at least one of the projection signals, The device comprises a signal processor configured to: obtain a time series of magnitude values representing a magnitude of a peak in a time series of two-dimensional interaction patterns generated by image reconstruction processing of the projection signals, the peak corresponding to the touching object on the touch surface; and generate, as a function of the time series of magnitude values, a time series of force values representing the application force of the touching object onto the touch surface.

A fourth aspect of the invention is a device for data processing in relation to the above-mentioned FTIR-based projection-type touch-sensing apparatus. The device comprises: means for obtaining a time series of magnitude values representing a magnitude of a peak in a time series of two-dimensional interaction patterns generated by image reconstruction processing of the projection signals, the peak corresponding to the touching object on the touch surface; and means for generating, as a function of the time series of magnitude values, a time series of force values representing the application force of the touching object onto the touch surface.

A fifth aspect of the invention is an FTIR-based projection-type touch-sensing apparatus, comprising: a transmissive panel configured to conduct radiation from a plurality of incoupling points to a plurality of outcoupling points by total internal reflection inside the transmissive panel, thereby defining a plurality of propagation paths beneath a touch surface on the transmissive panel between pairs of incoupling and outcoupling points such that a touching object on the touch surface causes the radiation on at least one of the propagation paths to be attenuated by frustration of the total internal reflection; at least one signal generator coupled to the incoupling points to generate the radiation; at least one signal detector coupled to the outcoupling points to detect the radiation on the plurality of propagation paths and generate corresponding projection signals; and a device according to the third or fourth aspect.

Any one of the above-identified embodiments of the first aspect may be adapted and implemented as an embodiment of the second to fifth aspects.

Still other objectives, features, aspects and advantages of the present invention will appear from the following detailed description, from the attached claims as well as from the drawings.

BRIEF DESCRIPTION OF DRAWINGS

Embodiments of the invention will now be described in more detail with reference to the accompanying schematic drawings.

DETAILED DESCRIPTION OF EXAMPLE EMBODIMENTS

Before describing embodiments of the invention, a few definitions will be given.

A "touch object" or "touching object" is a physical object that touches, or is brought in sufficient proximity to, a touch surface so as to be detected by one or more sensors in the touch system. The physical object may be animate or inanimate.

An "interaction" occurs when the touch object affects a parameter measured by the sensor.

An "interaction strength" is a relative or absolute measure of the degree of interaction. The "interaction strength" may be represented as an "attenuation".

An "interaction map" or "interaction pattern" is a two-dimensional (2D) distribution of interaction strength across the touch surface, or a portion thereof. If the interaction is presented as attenuation, the interaction map/pattern is also denoted an "attenuation map" or "attenuation pattern".

A "touch" denotes a point of interaction as seen in the interaction pattern.

A "frame" or "iteration" denotes a repeated event starting with data collection and ending with determination of touch data.

As used herein, a "trace" is information about the temporal history of an interaction. Touches from an interaction detected in a sequence of frames, i.e. at different points in time, are collected into a trace.

Throughout the following description, the same reference numerals are used to identify corresponding elements.

1. TOUCH-SENSITIVE APPARATUS

Figure 1A:
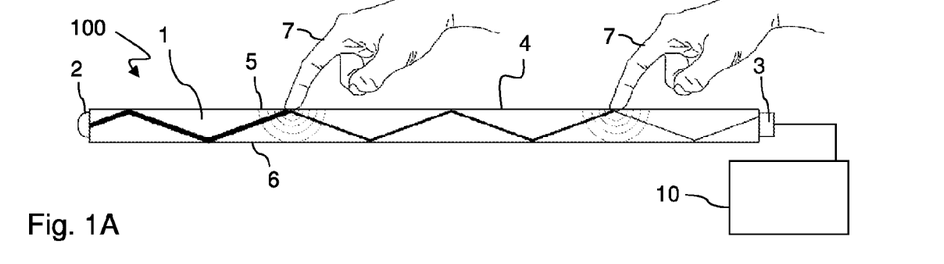
FIGS. 1A-1B are section and top plan views of an FTIR-based touch system of projection-type.
Figure 1B:
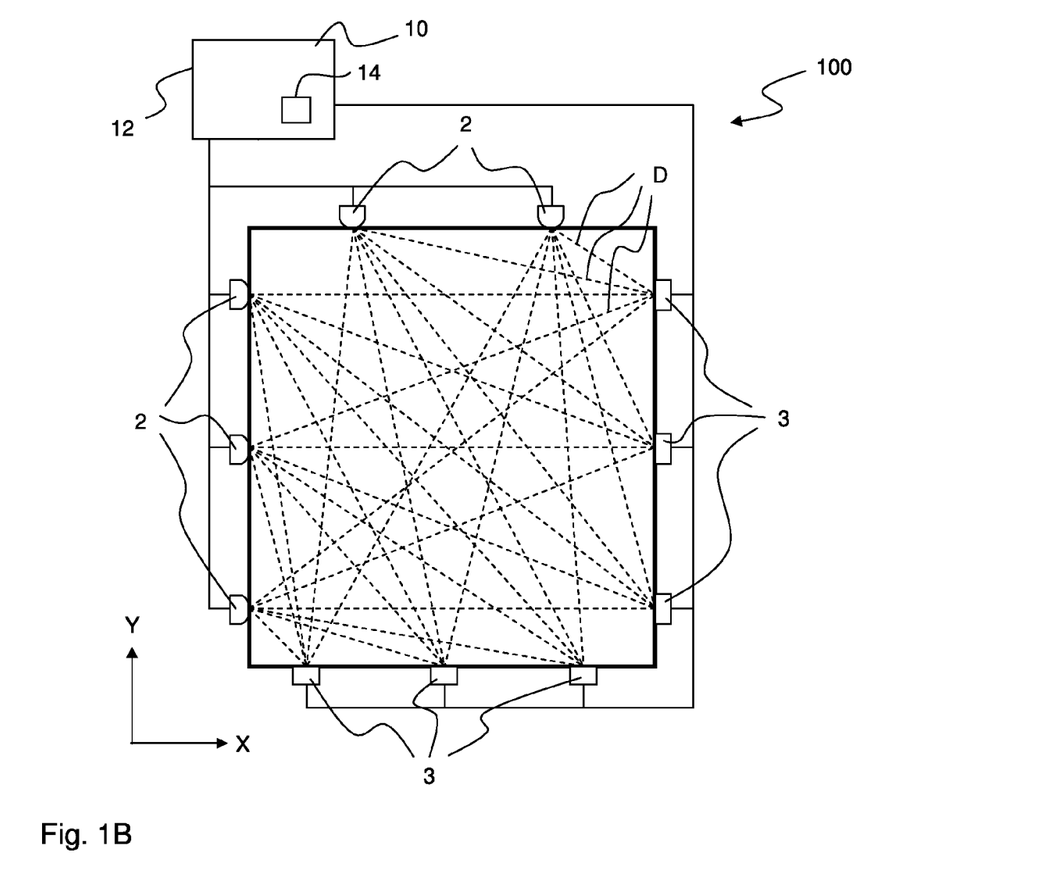

FIGS. 1A-1B illustrate an example embodiment of a touch-sensitive apparatus 100 that is based on the concept of FTIR (Frustrated Total Internal Reflection), also denoted "FTIR system". The apparatus operates by transmitting light inside a panel 1, from light emitters 2 to light sensors or detectors 3, so as to illuminate a touch surface 4 from within the panel 1. The panel 1 is made of solid material in one or more layers and may have any shape. The panel 1 defines an internal radiation propagation channel, in which light propagates by internal reflections. In the example of FIG. 1, the propagation channel is defined between the boundary surfaces 5, 6 of the panel 1, where the top surface 5 allows the propagating light to interact with touching objects 7 and thereby defines the touch surface 4. This is achieved by injecting the light into the panel 1 such that the light is reflected by total internal reflection (TIR) in the touch surface 4 as it propagates through the panel 1. The light may be reflected by TIR in the bottom surface 6 or against a reflective coating thereon. It is also conceivable that the propagation channel is spaced from the bottom surface 6, e.g. if the panel comprises multiple layers of different materials. The apparatus 100 may be designed to be overlaid on or integrated into a display device or monitor.

The apparatus 100 allows an object 7 that is brought into close vicinity of, or in contact with, the touch surface 4 to interact with the propagating light at the point of touch. In this interaction, part of the light may be scattered by the object 7, part of the light may be absorbed by the object 7, and part of the light may continue to propagate in its original direction across the panel 1. Thus, the touching object 7 causes a local frustration of the total internal reflection, which leads to a decrease in the energy (power/-intensity) of the transmitted light, as indicated by the thinned lines downstream of the touching objects 7 in FIG. 1A.

The emitters 2 are distributed along the perimeter of the touch surface 4 to generate a corresponding number of light sheets inside the panel 1. In the example of FIG. 1B, each emitter 2 generates a beam of light that expands in the plane of the panel 1 while propagating in the panel 1. Each beam propagates from one or more entry or incoupling points on the panel 1. The sensors 3 are distributed along the perimeter of the touch surface 4 to receive the light from the emitters 2 at a number of spaced-apart outcoupling points on the panel 1. It should be understood that the incoupling and outcoupling points merely refer to the position where the beam enters and leaves, respectively, the panel 1. Thus, one emitter/sensor may be optically coupled to a number of incoupling/outcoupling points. In the example of FIG. 1B, however, the detection lines D are defined by individual emitter-sensor pairs.

The sensors 3 collectively provide an output signal, which is received and sampled by a signal processor 10. The output signal contains a number of sub-signals, also denoted "projection signals", each representing the energy of light emitted by a certain light emitter 2 and received by a certain light sensor 3. Depending on implementation, the signal processor 10 may need to process the output signal for separation of the individual projection signals. Conceptually, the touch apparatus 100 is considered to define a grid of detection lines D on the touch surface 4, where each detection line D corresponds to a light propagation path from an emitter 2 to a sensor 3, as projected onto the touch surface 4. Thus, the projection signals represent the received energy or power of light on the individual detection lines D. It is realized that the touching object 7 results in a decrease (attenuation) of the received energy on one or more detection lines D.

As will be explained below, the signal processor 10 may be configured to process the projection signals so as to determine a distribution of attenuation values (for simplicity, referred to as an "attenuation pattern") across the touch surface 1, where each attenuation value represents a local attenuation of light. The attenuation pattern may be represented in many different ways, e.g. as attenuation values arranged in a regular x-y-grid, such as in an ordinary digital image, although other types of grids are conceivable, e.g. hexagonal patterns or triangular meshes.

In the illustrated example, the apparatus 100 also includes a controller 12 which is connected to selectively control the activation of the emitters 2 and, possibly, the readout of data from the sensors 3. The signal processor 10 and the controller 12 may be configured as separate units, or they may be incorporated in a single unit. One or both of the signal processor 10 and the controller 12 may be at least partially implemented by software executed by a processing unit 14.

It is to be understood that FIG. 1 merely illustrates one example of an FTIR system. For example, the detection lines may instead be generated by sweeping or scanning one or more beams of light inside the panel 1, and the light may instead be coupled into and out of the panel 1 via the top and bottom surfaces 5, 6, e.g. by the use of dedicated coupling elements attached to the panel 1. Prior art documents disclosing alternative FTIR systems are listed in the Background section, all of which are incorporated herein by this reference. The inventive concept may be applied to such alternative FTIR systems as well.

Figure 2:
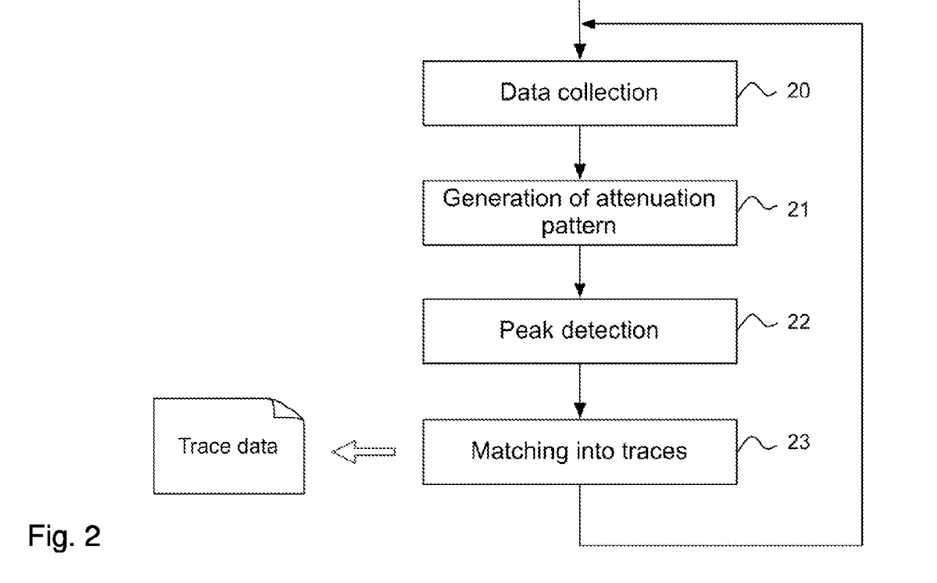
FIG. 2 is a flowchart of a data extraction process in the system of FIG. 1.

FIG. 2 is a flow chart of a data extraction process in an FTIR system. The process involves a sequence of steps 20-23 that are repeatedly executed, e.g. by the signal processor 10 (FIG. 1). In the context of this description, each sequence of steps 20-23 is denoted a frame or an iteration.

Each frame starts by a data collection step 20, in which measurement values are obtained from the light sensors 3 in the FTIR system, typically by sampling a value from each of the aforesaid projection signals. The data collection step 20 results in one projection value for each detection line. It may be noted that the data may, but need not, be collected for all available detection lines in the FTIR system. The data collection step 30 may also include pre-processing of the measurement values, e.g. filtering for noise reduction.

In a reconstruction step 21, the projection values are processed for generation of an attenuation pattern. To be described further in Chapter 2, step 21 may involve converting the projection values into input values in a predefined format, operating a dedicated reconstruction function on the input values for generating an attenuation pattern, and possibly processing the attenuation pattern to suppress the influence of contamination on the touch surface (fingerprints, etc).

In a peak detection step 22, the attenuation pattern is then processed for detection of peaks, e.g. using any known technique. In one embodiment, a global or local threshold is first applied to the offset pattern, to suppress noise. Any areas with attenuation values that fall above the threshold may be further processed to find local maxima. The identified maxima may be further processed for determination of a touch shape and a center position, e.g. by fitting a two-dimensional second-order polynomial or a Gaussian bell shape to the attenuation values, or by finding the ellipse of inertia of the attenuation values. There are also numerous other techniques as is well known in the art, such as clustering algorithms, edge detection algorithms, standard blob detection, water shedding techniques, flood fill techniques, etc. Step 22 results in a collection of peak data, which may include values of position, attenuation, size, and shape for each detected peak. The attenuation may be given by a maximum attenuation value or a weighted sum of attenuation values within the peak shape.

In a matching step 23, the detected peaks are matched to existing traces, i.e. traces that were deemed to exist in the immediately preceding frame. A trace represents the trajectory for an individual touching object on the touch surface as a function of time. Each trace may be associated with plural trace parameters, such as a global age, an attenuation, a location, a size, a location history, a speed, etc. The "global age" of a trace indicates how long the trace has existed, and may be given as a number of frames, the frame number of the earliest touch in the trace, a time period, etc. The attenuation, the location, and the size of the trace are given by the attenuation, location and size, respectively, of the most recent touch in the trace. The "location history" denotes at least part of the spatial extension of the trace across the touch surface, e.g. given as the locations of the latest few touches in the trace, or the locations of all touches in the trace, a curve approximating the shape of the trace, or a Kalman filter. The "speed" may be given as a velocity value or as a distance (which is implicitly related to a given time period). Any known technique for estimating the tangential speed of the trace may be used, taking any selection of recent locations into account. In yet another alternative, the "speed" may be given by the reciprocal of the time spent by the trace within a given region which is defined in relation to the trace in the attenuation pattern. The region may have a pre-defined extent or be measured in the attenuation pattern, e.g. given by the extent of the peak in the attenuation pattern.

The matching step 23 may be based on well-known principles and will not be described in detail. For example, step 23 may operate to predict the most likely values of certain trace parameters (location, and possibly size and shape) for all existing traces and then match the predicted values of the trace parameters against corresponding parameter values in the peak data produced in the peak detection step 22. The prediction may be omitted. Step 23 results in "trace data", which is an updated record of existing traces, in which the trace parameter values of existing traces are updated based on the peak data. It is realized that the updating also includes deleting traces deemed not to exist (caused by an object being lifted from the touch surface, "touch up"), and adding new traces (caused by an object being put down on the touch surface, "touch down").

Following step 23, the process returns to step 20.

It is to be understood that one or more of steps 20-23 may be effected concurrently. For example, the data collection step 20 of a subsequent frame may be initiated concurrently with any one of the steps 21-23.

2. RECONSTRUCTION FUNCTION AND INPUT FORMAT (STEP 21)

Any available algorithm for image reconstruction based on projection signal values may be used as reconstruction function in step 21 (FIG. 2), including tomographic reconstruction methods such as Filtered Back Projection, FFT-based algorithms, ART (Algebraic Reconstruction Technique), SART (Simultaneous Algebraic Reconstruction Technique), etc. Alternatively, the reconstruction function may generate the attenuation pattern by adapting one or more basis functions and/or by statistical methods such as Bayesian inversion. Examples of image reconstruction functions designed for use in touch determination are found in WO2009/077962, WO2011/049511, WO2011/139213, WO2012/050510, WO2013/062471, PCT/SE2013/050197 filed on Mar. 7, 2013, PCT/SE2013/050198 filed on Mar. 7, 2013, PCT/SE2013/050473 filed on Apr. 29, 2013, and PCT/SE2013/050474 filed on Apr. 29, 2013, all of which are incorporated herein by reference. Conventional image reconstruction techniques are found in the mathematical literature, e.g. "The Mathematics of Computerized Tomography" by Natterer, and "Principles of Computerized Tomographic Imaging" by Kak and Slaney.

The image reconstruction function is designed based on the assumption that input values $s_t$ at time point t depend on the attenuation pattern, $a_t$, according to a projection function $\mathcal{P}$, which reflects the properties of the physical touch system: $s_t = \mathcal{P}(a_t)$. The reconstruction algorithm is thus designed to reconstruct $a_t$ from $s_t$ by use of a reconstruction function: $a_t = \mathcal{P}'(s_t)$.

It is to be understood that the format of the input values $s_t$ may be specific to the reconstruction function $\mathcal{P}'$. To enable reconstruction of an attenuation pattern, the input values $s_t$ may be represented as attenuation values for individual detection lines. Such attenuation values may e.g. be based on transmission values obtained by dividing the projection value $I_k$ of the k:th detection line by a respective reference value: $T_k = I_k / REF_k$. By proper choice of reference values, the transmission values may be generated to represent the fraction (e.g. in the range [0, 1]) of the available light energy that has been measured on each of the detection lines. To represent attenuation, the input value of each detection line may e.g. be given by: $s_k = -\log(T_k)$ or an approximation thereof, e.g. $s_k = 1 - T_k$.

The reconstructed attenuation pattern $a_t$ will represent the distribution of accumulated attenuation on the touch surface at time point t. The accumulated attenuation includes both attenuation caused by touching objects and attenuation caused by contamination on the touch surface. Such an attenuation pattern $a_t$ is denoted a "total pattern" in the following.

It is also known in the art to at least partly compensate the total attenuation pattern $a_t$ for the influence of the contamination on the touch surface, resulting in a compensated attenuation pattern $o_t$, denoted "offset pattern" in the following. Thus, the offset pattern $o_t$ is produced to reflect long-term changes in touch-related attenuation on the touch surface, e.g. attenuation changes compared to a clean touch surface without touching objects. Different techniques for generating such a compensated attenuation pattern are, e.g., found in WO2011/028169, WO2011/049512, WO2012/121652, and WO2013/048312, which are all incorporated herein in their entirety by reference. In a further alternative, each individual projection signal may be subjected to a high-pass filtering in the time domain, whereby the thus-filtered projection signals may be at least partly compensated for influence of contamination on the touch surface.

Figure 3A:
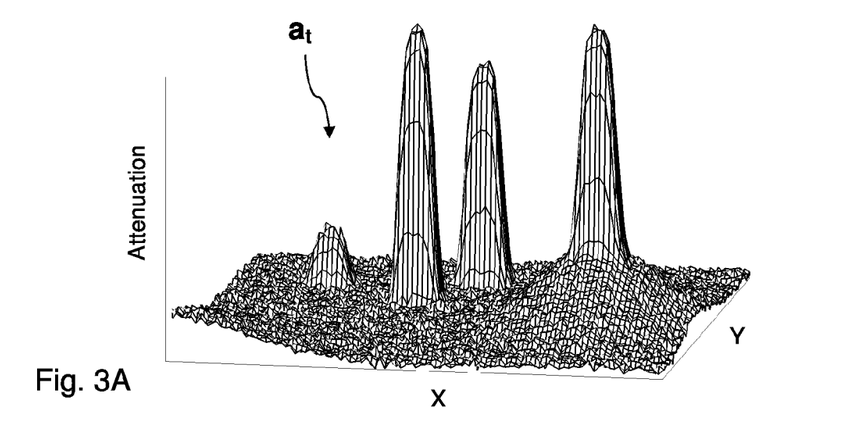
FIGS. 3A-3C are 3D plots of a total attenuation pattern, a background pattern, and an offset pattern, respectively.
Figure 3B:
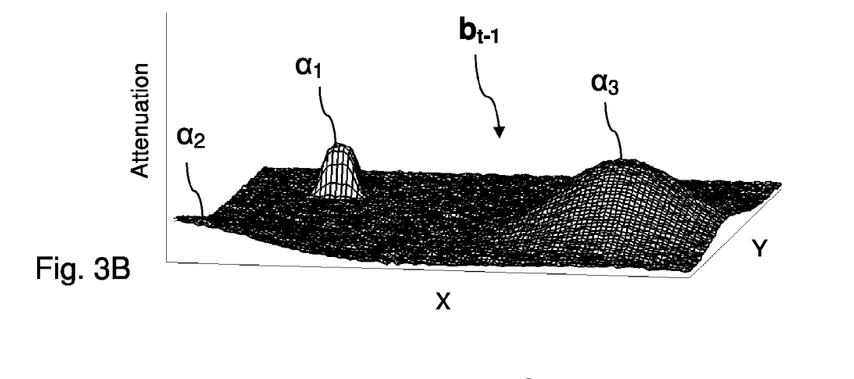
Figure 3C:
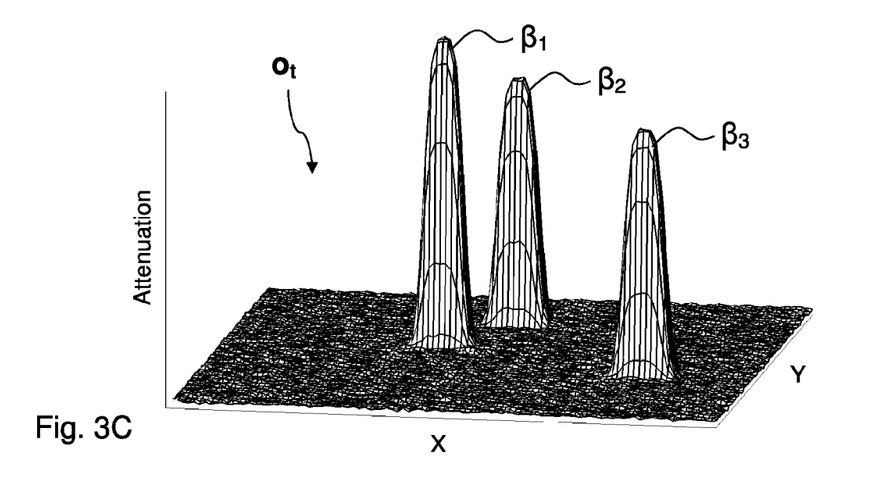

FIG. 3 gives an example on how the compensation may be implemented, according to above-mentioned WO2011/049512. In the illustrated example, a "background pattern" is maintained (i.e. updated during the iterations of steps 20-23 in FIG. 2) to represent an estimation of the attenuation that originates from contamination on touch surface. FIG. 3A is a 3D plot of a total pattern $a_t$ in the coordinate system X,Y of the touch surface (cf. FIG. 1B). The pattern $a_t$ represents the accumulated attenuation on the touch surface, both from touches and contamination. FIG. 3B is a 3D plot of the above-mentioned background pattern $b_{t-1}$ which exhibits a first attenuation component α1 caused by a fingerprint from an earlier touch, a second attenuation component α2 caused by smear from a palm resting on the touch surface, and a third attenuation component α3 caused by a liquid spill. FIG. 3B is thus a "snap-shot" of the estimated attenuation by contamination. FIG. 3C is a 3D plot of the offset pattern $o_t$ obtained by subtracting the pattern $b_{t-1}$ from the pattern $a_t$, pixel by pixel. Three peaks β1, β2, β3 forming three touches are seen against a uniform background level close to zero attenuation.

Depending on implementation, peak detection step 22 (FIG. 2) may operate on either the total pattern $a_t$ or the offset pattern $o_t$ (if generated). It is to be understood that the total pattern $a_t$ or offset pattern $o_t$ may be subjected to post-processing before step 22. Such post-processing may involve different types of filtering, for noise removal and/or image enhancement.

3. FORCE ESTIMATION

In embodiments of the invention, the current attenuation of the respective trace is used for estimating the current application force for the trace, i.e. the force by which the user presses the corresponding touching object against the touch surface. It should be recalled that the current attenuation of a trace is given by the attenuation value that is determined by step 22 (FIG. 2) for a peak in the current attenuation pattern.

Generally, it may be difficult to estimate the application force on an absolute scale, since there are a number of factors that affect the attenuation and it may be difficult to control or estimate these factors with sufficient accuracy during operation of the touch system. Such factors include, e.g., differences in contamination on the touch surface over time and between different positions on the touch surface, differences in contact properties of the touching objects (humidity, amount of grease, etc). Although it might be possible to calibrate the estimated application force into absolute units, the following disclosure will focus on techniques for generating a time series of estimated force values that represent relative changes in application force over time for the respective trace, and possibly also between different traces. Thereby, the estimated force values may be processed to detect that a user intentionally increases or decreases the application force during a trace, or that a user intentionally increases or decreases the application force of one trace in relation to another trace.

Figure 4:
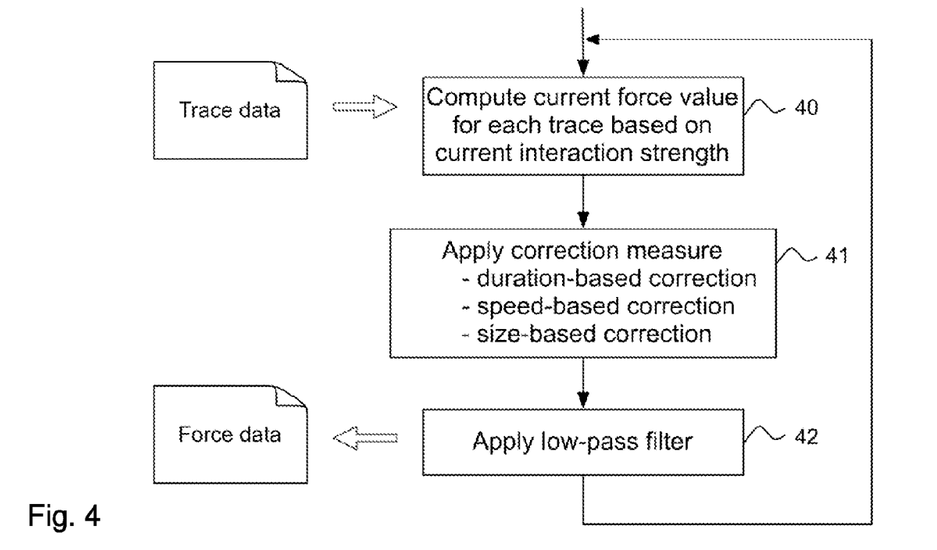
FIG. 4 is a flowchart of a force estimation process that operates on data provided by the process in FIG. 2.

FIG. 4 is a flow chart of a force estimation process according to an embodiment. The force estimation process operates on the trace data provided by the data extraction process in FIG. 2. It should be noted that the process in FIG. 4 operates in synchronization with the process in FIG. 2, such that the trace data resulting from a frame in FIG. 2 is then processed in a frame in FIG. 4. In a first step 40, a current force value for each trace is computed based on the current attenuation of the respective trace given by the trace data. In one implementation, the current force value may be set equal to the attenuation, and step 40 may merely amount to obtaining the attenuation from the trace data. In another implementation, step 40 may involve a scaling of the attenuation. Following step 40, the process may proceed directly to step 42. However, to improve the accuracy of the estimated force values, step 41 applies one or more of a number of different corrections to the force values generated in step 40. Step 41 may thus serve to improve the reliability of the force values with respect to relative changes in application force, reduce noise (variability) in the resulting time series of force values that are generated by the repeated execution of steps 40-42, and even to counteract unintentional changes in application force by the user. As indicated in FIG. 4, step 41 may include one or more of a duration correction, a speed correction, and a size correction.

Figure 5A:
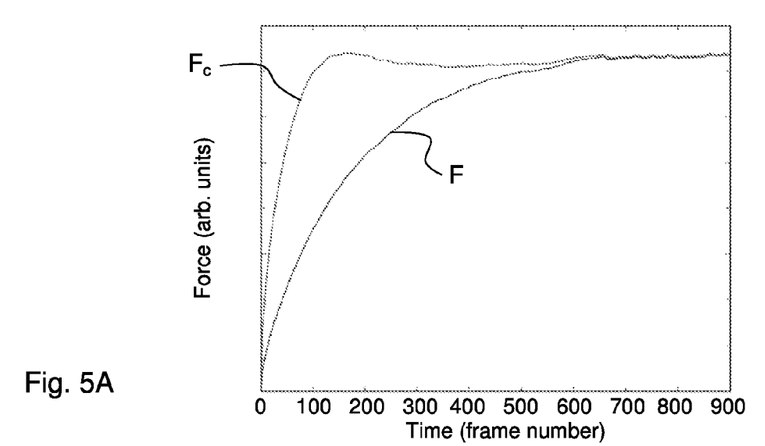
FIGS. 5A-5B show a time sequence of force values for a stationary touch and a slowly moving touch, respectively, before and after compensation.
Figure 5B:
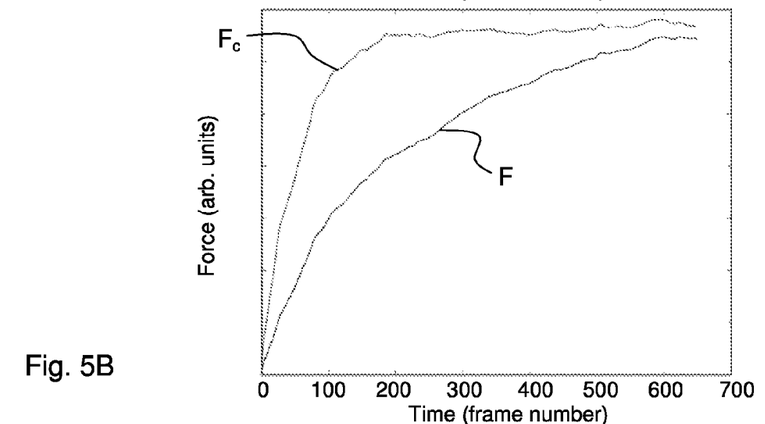

Experiments have shown that a stationary trace, i.e. a trace that remains in essentially the same position on the touch surface, has an attenuation that grows significantly over time towards an asymptotic value, even if the application force does not change in this time period. This duration growth phenomenon is observed both for new traces, i.e. directly after touch down, and when moving traces (drags) have been brought to a halt. The duration growth phenomenon is also observed for slowly moving traces, but is of less importance for traces at higher speeds. FIG. 5A is a plot of a series of force values F for a stationary trace as a function of time since touch down (with constant application force), and FIG. 5B is a corresponding plot for a slowly moving trace (with constant application force).

To suppress the impact of the duration growth phenomenon, a "duration correction" is applied in step 41. The duration correction is primarily relevant for stationary and slowly moving traces, which are identified by comparing the current speed of the trace (included in the trace data) to a given speed threshold $T_{LS}$. The speed threshold $T_{LS}$ may differ between different touch systems and may need to be tuned to a given touch system by testing. In the following, the speed threshold $T_{LS}$ is set to 10 mm/s. Thus, all traces with a speed below the speed threshold $T_{LS}$ is considered to be in a "low speed state" (LS state). The duration correction may be made by applying any suitable function that counteracts the growth. In the following example, the duration correction is actually applied to all traces, but the amount of correction is drastically reduced as a trace leaves the LS state. Since attenuation has been found to grow with time since entry into the LS state, step 41 assigns an LS age counter to all traces and increments the LS age counter with the duration of each trace in the LS state. The LS age counter is not a fix point counter, since the incremental change per frame is modified depending on trace speed, for reasons explained later on. The LS age counter is limited to values between zero and a maximum value, which is set to avoid that the duration correction results in a significant under-compensation of the force values when a trace starts to move after being stationary for a long time.

In a non-limiting example, the duration correction function applies an exponential decay to each force value F from step 40:

$$F_c = Fc_1(1 + c_2 e^{-\frac{\Delta t}{t_0}}),$$

where $F_c$ is a corrected force value, $\Delta t$ is the LS age counter, $t_0$ is a time constant, and $c_1$ and $c_2$ are constants. FIGS. 5A and 5B illustrate a series of corrected force values $F_c$ obtained by operating the exponential decay function on the respective series of uncorrected force values F. In the illustrated example, the correction function is designed to lift the force values towards the asymptotic level of the uncorrected force values, but any other level may be used by proper selection of the constant $c_1$.

Figure 6:
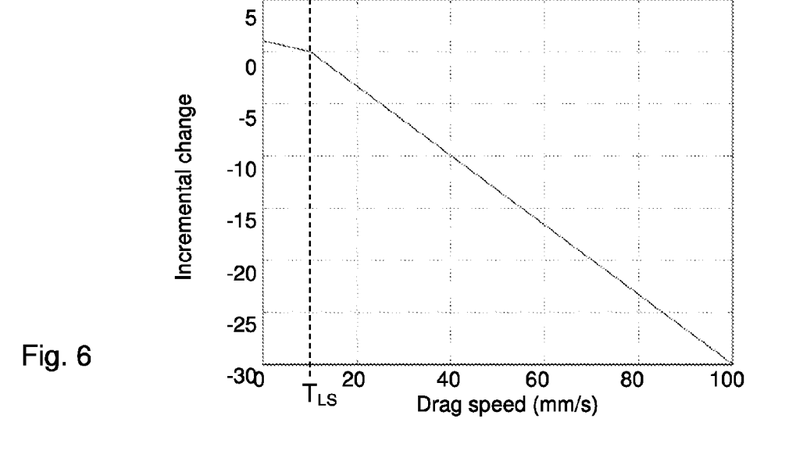
FIG. 6 illustrates a speed-based control function for incremental change of a counter for use in the force estimation process of FIG. 4.

In order to avoid abrupt changes in the corrected force values when a stationary trace starts to move, the incremental change of the LS age counter is gradually decreased with increasing speed in the LS state. One example is shown in FIG. 6, where the dashed line indicates the speed threshold $T_{LS}$. As seen, the incremental change is decreased to be zero at the speed threshold $T_{LS}$. Thus, the LS age counter is increased frame by frame as long as the trace is in the LS state, but with a gradually smaller increment as the speed of the trace approaches the speed threshold $T_{LS}$. In the example in FIG. 6, the incremental change is set to be negative (i.e. a decrement) above the speed threshold $T_{LS}$, and the decrement increases with increasing speed. Thereby, as a trace leaves the LS state, the duration correction will continue but at a rapidly decreasing degree.

Figure 7A:
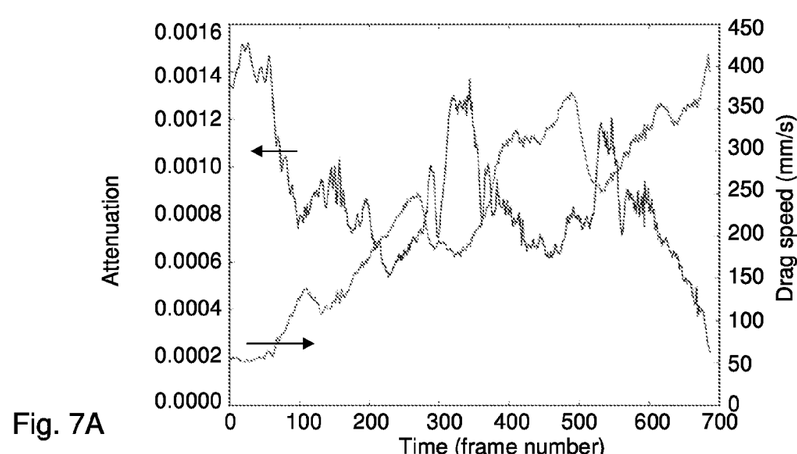
FIG. 7A shows associated attenuation values and speed values during acceleration of a touch.
Figure 7B:
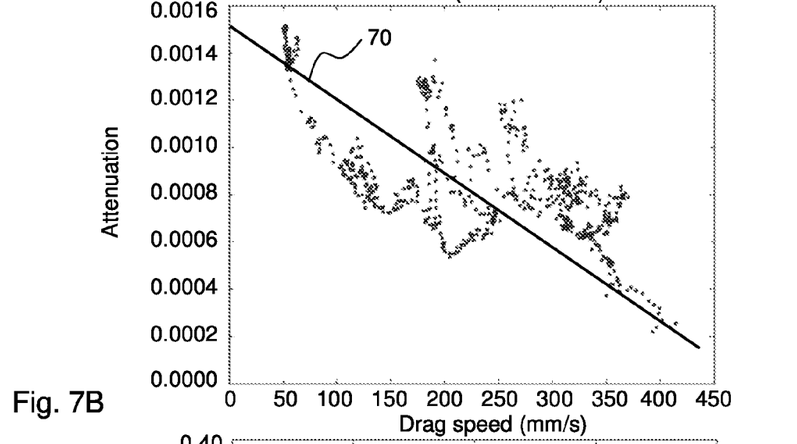
FIG. 7B is a scatter plot of the attenuation and speed values in FIG. 7A.

Experiments have also shown that the attenuation decreases with increasing speed of the trace. This fall-off phenomenon is seen in FIG. 7A, which is a plot of the attenuation values generated by steps 20-23 for a touch while the speed of the touch is generally increased. The application force was constant during the measurement. FIG. 7B is a scatter plot of the measurement data in FIG. 7A, showing the correlation between attenuation and drag speed. There is a significant spread in the data, which is at least partly due to the touching object, which is a fingertip, being swept through its own deposits of fingerprints on the touch surface. The impact of this data scatter is suppressed by the low-pass filter in step 42 (see below).

To suppress the impact of the fall-off with speed, a "speed correction" is applied in step 41, by operating a speed correction function on the force values from the duration correction. In one example, the speed correction function subtracts a correction factor, which is decreased with the current speed of the trace, from the force values to suppress the variation with speed. In one example, the correction factor decreases linearly with increasing speed, to counteract an estimated linear relation between attenuation and speed indicated by line 70 in FIG. 7B. Of course, other speed correction functions are possible depending on the relation between attenuation and speed. The speed correction may be applied to all traces, or only to traces with a speed above a certain threshold, which may but need not be the threshold $T_{LS}$.

The speed correction function may be designed to slightly over-compensate the force values with speed, to counteract a tendency of the user to inadvertently apply a smaller force for faster drags than for slower drags. Friction between the touching object and the touch surface may make it uncomfortable for user to apply the same pressure to slower and faster drags. Thus, the over-compensation may result in force values that more accurately reflect the intention of the user.

Experiments have also shown that the attenuation may increase with the size of the trace, even if application force is unchanged. To suppress the impact of this phenomenon, a "size correction" is applied in step 41 (FIG. 4), which modifies the force values with respect to the current size of the trace (included in the trace data). It is to be noted that the size may, but need not, represent the true extent of the peak in the interaction pattern. As an alternative, the size may be given by any metric that is proportional to the size of the peak, e.g. a metric that compares the attenuation value of the peak with the attenuation value of one or more surrounding pixels.

It should be understood that the above-described corrections may be applied in any order, and that step 41 may be limited to only one or two of the above-described corrections. Furthermore, if the speed of the trace is not included in the trace data, the force estimation process in FIG. 4 may include a separate step (not shown) that computes the current speed of each trace based on the location history of the trace.

The low-pass filtering step 42 is included to reduce variations in the time series of force values that are produced by step 40/41. Any available low-pass filter may be used. In the following example, step 42 applies a low-pass filter that implements exponential smoothing:

$$\begin{cases} s_0 = x_0 \\ s_t = \alpha x_t + (1-\alpha)s_{t-1}, t > 0 \end{cases}$$

where $x_t$ denotes the current force value and a denotes the so-called smoothing factor, $0<\alpha<1$. The exponential smoothing produces each filtered force value as a weighted average of the current force value and preceding force values, where the weights assigned to previous observations are in general proportional to the terms of the geometric progression $\{1, (1-\alpha), (1-\alpha)^2, (1-\alpha)^3, \ldots\}$. Thus, a larger smoothing factor $\alpha$ results in less smoothing, which is equivalent to a higher cut-off frequency of the low-pass filter.

Figure 8:
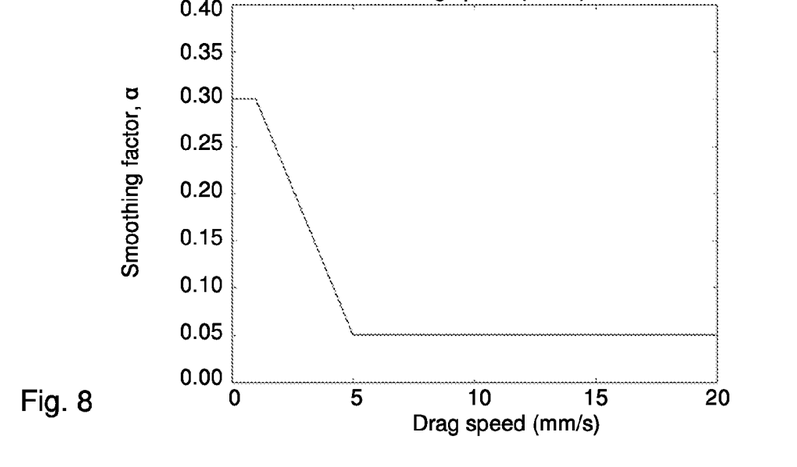
FIG. 8 illustrates a speed-based control function for a smoothing factor of a low-pass filter for use in the force estimation process of FIG. 4.

One effect of applying a low-pass filter is that it introduces an unwanted latency in the filtered force values. In one embodiment, latency is reduced by dynamically changing the smoothing factor $\alpha$ (and thus the cut-off frequency) with respect to the current trace speed, such that less smoothing is applied to force values of stationary or almost stationary touches. The need for low-pass filtering is generally more pronounced for moving traces than for stationary traces, since estimated force values are more uncertain (noisy) for moving traces. One reason is that the attenuation may vary whenever the moving trace passes contamination on the touch surface. Another reason is that moving objects on the touch surface have a tendency to vibrate against the touch surface due to friction, resulting in variations in attenuation. Thus, as shown in FIG. 8, a larger smoothing factor $\alpha$ may be applied for lower trace speeds that for higher trace speeds. In the example of FIG. 8, the smoothing factor $\alpha$ is gradually decreased for traces that start to move, to prevent rapid changes in the degree of smoothing imposed on the force values.

Step 42 may also be implemented to delay the transition to a higher cut-off frequency (less smoothing) for moving traces that are brought to a halt, so as to prevent rapid changes in the degree of smoothing. The skilled person realizes that such a delay may be achieved in many ways. In one example, step 42 operates to reduce the smoothing factor $\alpha$ if the LS age counter has low value (in relation to a predefined limit).

Figure 9A:
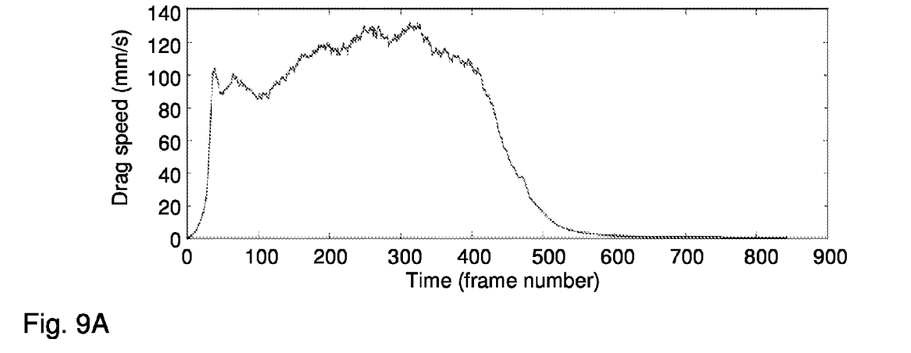
FIGS. 9A-9C show time sequences of associated speed values, attenuation values and force values, respectively.
Figure 9B:
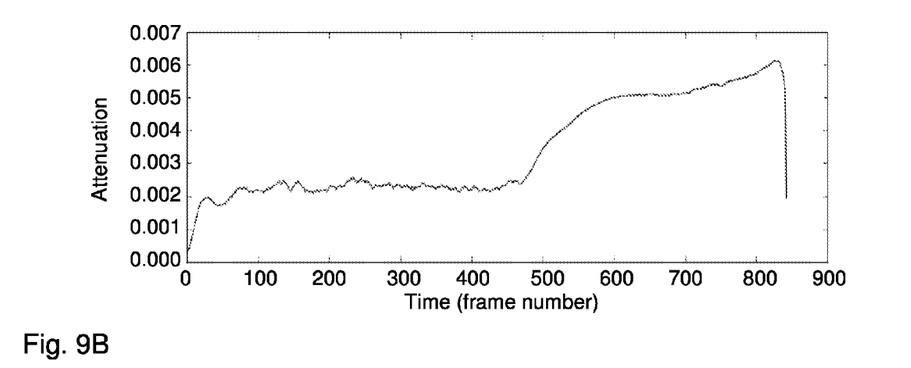
Figure 9C:
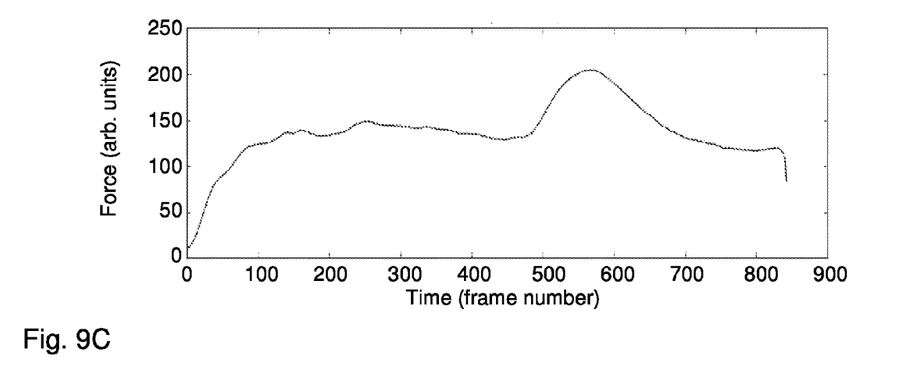

FIGS. 9A-9C show speed values, attenuation values and force values for a touching object. As indicated by the speed data in FIG. 9A, the touching object is brought into contact with the touch surface, accelerated to a speed of about 110 mm/s, moved at approximately this speed for a period of time (until frame 400), and is then brought to a halt. The application force is unchanged during this sequence of events. The time series of attenuation values for the corresponding touch is shown in FIG. 9B. The individual attenuation values are produced by step 22 in FIG. 2 and are matched into a time series (a trace) by step 23 in FIG. 2. As seen in FIG. 9B, the above-mentioned duration growth phenomenon causes the attenuation to be tripled (200% increase) when the touching object has been brought to a halt. FIG. 9C shows the corresponding time series of force values that are generated by steps 40-42 in FIG. 4, while applying a duration correction in step 41 and the exponential filtering in step 42. As seen, the force values increase temporarily by 50% when the touching object is halted and then return to the same force level as during movement of the touching object. It is understood that relative changes in application force are easier to detect and interpret in the series of force values in FIG. 9C than in the series of attenuation values in FIG. 9B.

Figure 10:
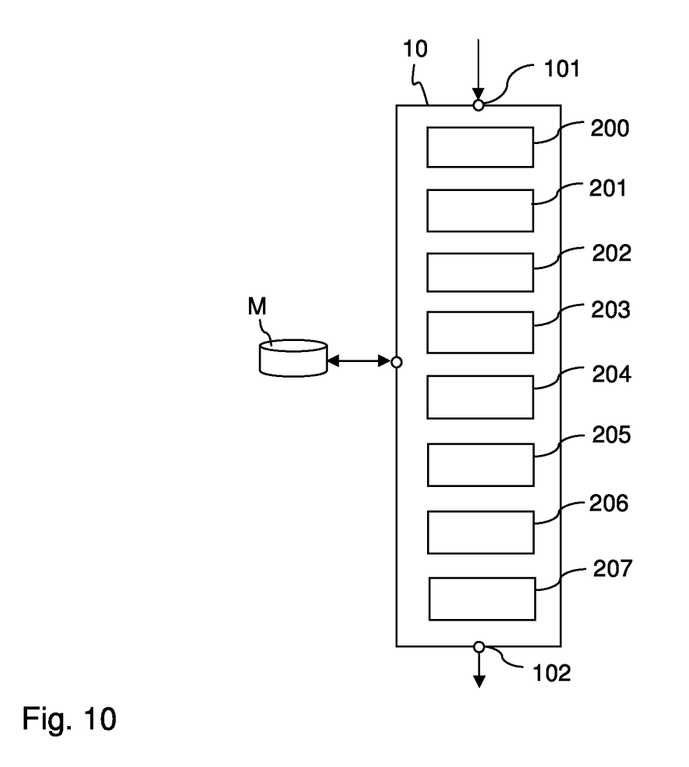
FIG. 10 is a block diagram of a structure for implementing the processes in FIGS. 3-4.

The force estimation process in FIG. 4 may be executed separately from the data extraction process in FIG. 2, e.g. on separate devices or on a single device (e.g. the signal processor 10 in FIG. 1). Alternatively, the processes in FIGS. 2 and 4 may be integrated into one process for execution on a single device. FIG. 10 shows an example of a data processing device 10, which includes an input 100 for receiving the projection signals. The device 10 further includes a data collection element (or means) 200 for obtaining the current projection values, a reconstruction element 201 that implements step 21, a peak detection element (or means) 202 that implements step 22, a matching element (or means) 203 that implements step 23, a force estimation element (or means) 204 that implements step 40, a force correction element (or means) 205 that implements step 41, a filtering element (or means) 206 that implements step 42, an output element (or means) 207 for providing current force values (and the trace data determined by the matching element 203) via an output 102.

The device 10 may be implemented by special-purpose software (or firmware) run on one or more general-purpose or special-purpose computing devices. In this context, it is to be understood that each "element" or "means" of such a computing device refers to a conceptual equivalent of a method step; there is not always a one-to-one correspondence between elements/means and particular pieces of hardware or software routines. One piece of hardware sometimes comprises different means/elements. For example, a processing unit may serve as one element/means when executing one instruction, but serve as another element/means when executing another instruction. In addition, one element/means may be implemented by one instruction in some cases, but by a plurality of instructions in some other cases. Naturally, it is conceivable that one or more elements (means) are implemented entirely by analog hardware components.

The software controlled device 10 may include one or more processing units, e.g. a CPU ("Central Processing Unit"), a DSP ("Digital Signal Processor"), an ASIC ("Application-Specific Integrated Circuit"), discrete analog and/or digital components, or some other programmable logical device, such as an FPGA ("Field Programmable Gate Array"). The device 10 may further include a system memory and a system bus that couples various system components including the system memory to the processing unit. The system bus may be any of several types of bus structures including a memory bus or memory controller, a peripheral bus, and a local bus using any of a variety of bus architectures. The system memory may include computer storage media in the form of volatile and/or non-volatile memory such as read only memory (ROM), random access memory (RAM) and flash memory. The special-purpose software and associated control parameter values may be stored in the system memory, or on other removable/non-removable volatile/non-volatile computer storage media which is included in or accessible to the computing device, such as magnetic media, optical media, flash memory cards, digital tape, solid state RAM, solid state ROM, etc. The data processing device 10 may include one or more communication interfaces, such as a serial interface, a parallel interface, a USB interface, a wireless interface, a network adapter, etc, as well as one or more data acquisition devices, such as an A/D converter. The special-purpose software may be provided to the device 10 on any suitable computer-readable medium, including a record medium, and a read-only memory.

4. CONCLUDING REMARKS

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and the scope of the appended claims.

Depending on reconstruction function, the format of the above-mentioned input values $s_t$ may, instead of representing attenuation, be given as a transmission (e.g. given by the projection value normalized by the reference value), an energy difference (e.g. given by the difference between the projection value and the reference value), or a logarithm of the energy difference. It is to be realized that the reconstruction function may generate an interaction pattern that reflects the format of the input values. As used hereinabove, a "logarithm" is intended to also encompass functions approximating a true logarithmic function, in any base. Furthermore, the input values $s_t$ may have any sign, i.e. they may or may not be multiplied by a negative value.

Further, it is conceivable to apply further corrections to the force values. For example, the attenuation may increase slightly with the duration of the trace (i.e. time since touch down). The duration of the trace is indicated by the above-mentioned global age, which thus may be used as input to a modification function designed to correct the force values for this attenuation increase over time.

The invention claimed is:

1. A method of data processing in relation to a frustrated total internal reflection (FTIR)-based projection-type touch-sensing apparatus, wherein the touch-sensing apparatus is operable to generate projection signals representing radiation that has propagated on a plurality of propagation paths by total internal reflections inside a transmissive panel beneath a touch surface of the transmissive panel such that a touching object on the touch surface causes attenuation of at least one of the projection signals, said method comprising:
generating by image reconstruction processing of the projection signals, a peak corresponding to a touching object on the touch surface; and
generating, as a function of a time series of magnitude values, a time series of force values representing an application force of the touching object onto the touch surface, wherein
a current force value in the time series of force values is generated as a function of a current magnitude value among the magnitude values and a current speed of the touching object.

2. The method of claim 1, further comprising:
detecting, based on the current speed, that the touching object is in a low speed state; and
applying a duration-based modification function to the current magnitude value to counteract a gradual increase in attenuation with time for touching objects in the low speed state.

3. The method of claim 2, further comprising:
associating the touching object with a counter, which is incremented with a duration of the touching object in the low speed state, wherein
the duration-based modification function operates on the counter and the current magnitude value.

4. The method of claim 3, further comprising:
applying an increment to the counter that decreases with the current speed while the touching object is in the low speed state.

5. The method of claim 3, further comprising:
applying a decrement to the counter when the touching object has left the low speed state.

6. The method of claim 5, wherein the decrement is increased with increasing current speed of the touching object.

7. The method of claim 1, further comprising:
operating a low-pass filter on at least one of the time series of force values and the time series of magnitude values.

8. The method of claim 7, further comprising:
decreasing a cut-off frequency of the low-pass filter with increasing current speed of the touching object.

9. The method of claim 8, further comprising:
selectively delaying an increase in the cut-off frequency of the low-pass filter when the touching object is deemed to approach a stand-still on the touch surface.

10. The method of claim 1, further comprising:
applying a speed-based modification function to the current magnitude value to counteract a decreasing attenuation with increasing speed of the touching object.

11. The method of claim 1, further comprising:
obtaining a time series of size values representing a size measure of the peak in two-dimensional interaction patterns; and
applying a size-based modification function to the current magnitude value to counteract an increasing attenuation with increasing size of the peak.

12. The method of claim 1, further comprising:
obtaining the time series of magnitude values by repeatedly obtaining current values of the projection signals,
processing the current values by image reconstruction to generate a current interaction pattern for the touch surface,
identifying a peak associated with the touching object in the current interaction pattern, and
computing a magnitude value for the identified peak.

13. The method of claim 12, wherein the computed magnitude value represents a degree of attenuation or transmission of radiation at the location of the touching object on the touch surface.

14. A non-transitory computer readable medium comprising computer instructions which, when executed by a data-processing system, cause the data-processing system to carry out the method of claim 1.

15. A device for data processing in relation to a frustrated total internal reflection (FTIR)-based projection-type touch-sensing apparatus, wherein the touch-sensing apparatus is operable to generate projection signals for radiation that has propagated on a plurality of propagation paths by total internal reflections inside a transmissive panel beneath a touch surface on the transmissive panel such that a touching object on the touch surface causes attenuation of at least one of the projection signals, said device comprising a signal processor configured to:
obtain a time series of magnitude values representing a magnitude of a peak in a time series of two-dimensional interaction patterns generated by image reconstruction processing of the projection signals, the peak corresponding to the touching object on the touch surface; and
generate, as a function of the time series of magnitude values, a time series of force values representing an application force of the touching object onto the touch surface, wherein
a current force value in the time series of force values is generated as a function of a current magnitude value among the magnitude values and a current speed of the touching object.

16. A device for data processing in relation to a frustrated total internal reflection (FTIR)-based projection-type touch-sensing apparatus, wherein the touch-sensing apparatus is operable to generate projection signals for radiation that has propagated on a plurality of propagation paths by total internal reflections inside a transmissive panel beneath a touch surface on the transmissive panel such that a touching object on the touch surface causes attenuation of at least one of the projection signals, said device comprising:

means for obtaining a time series of magnitude values representing a magnitude of a peak in a time series of two-dimensional interaction patterns generated by image reconstruction processing of the projection signals, the peak corresponding to the touching object on the touch surface; and     means for generating, as a function of the time series of magnitude values, a time series of force values representing an application force of the touching object onto the touch surface, wherein         a current force value in the time series of force values is generated as a function of a current magnitude value among the magnitude values and a current speed of the touching object.

17. A frustrated total internal reflection (FTIR)-based projection-type touch-sensing apparatus, comprising:

a transmissive panel configured to conduct radiation from a plurality of incoupling points to a plurality of outcoupling points by total internal reflection inside the transmissive panel, thereby defining a plurality of propagation paths beneath a touch surface on the transmissive panel between pairs of the incoupling and outcoupling points such that a touching object on the touch surface causes the radiation on at least one of the propagation paths to be attenuated by frustration of the total internal reflection;

at least one signal generator coupled to the plurality of incoupling points to generate the radiation;

at least one signal detector coupled to the plurality of outcoupling points to detect the radiation on the plurality of propagation paths, and to generate corresponding projection signals; and     a device according to claim 15.

\* \* \* \* \*